United States Patent

[11] 3,618,607

| [72] | Inventors | Myron B. Ells<br>Somerville;<br>Fred H. Steiger, East Brunswick, both of N.J. |
|---|---|---|
| [21] | Appl. No. | 12,002 |
| [22] | Filed | Feb. 17, 1970 |
| [45] | Patented | Nov. 9, 1971 |
| [73] | Assignee | Johnson & Johnson |

[54] SALINE FLUID ABSORPTION AND RETENTION TAMPONS AND METHODS OF MAKING THE SAME
7 Claims, 4 Drawing Figs.

[52] U.S. Cl. ................................................ 128/285,
8/116.2, 8/129
[51] Int. Cl. ........................................................ A61f 13/20
[50] Field of Search ............................................ 128/156,
284, 285, 287, 290, 296; 8/116.2, 129, 116.4

[56] References Cited
UNITED STATES PATENTS

| 2,845,070 | 7/1958 | Lening ......................... | 128/285 |
| 2,971,815 | 2/1961 | Bullock et al. ................ | 8/116.2 |
| 3,055,369 | 9/1962 | Graham, Jr. ................... | 128/285 |
| 3,224,926 | 12/1965 | Bernardin ...................... | 8/116.4 |
| 3,317,513 | 5/1967 | Rice .............................. | 8/116.2 |
| 3,423,167 | 1/1969 | Kuzmak et al. ............... | 8/129 |
| 3,525,735 | 8/1970 | Miller ............................ | 128/296 X |
| 3,542,028 | 11/1970 | Beebe et al. .................. | 128/290 R |
| 3,563,241 | 2/1971 | Evans et al. ................... | 128/290 W |

*Primary Examiner*—Charles F. Rosenbaum
*Attorneys*—Alexander T. Kardos, W. Frederick Mayer, Jr. and Robert L. Minier ABSTRACT: An improved saline fluid absorption and retention tampon having a density of from about 0.4 gram per cubic centimeter to about 0.8 gram per cubic centimeter and comprising water-insoluble, wet cross-linked carboxyalkyl cellulose having average degrees of substitution of from about 0.4 to about 1.3, and methods of making the same.

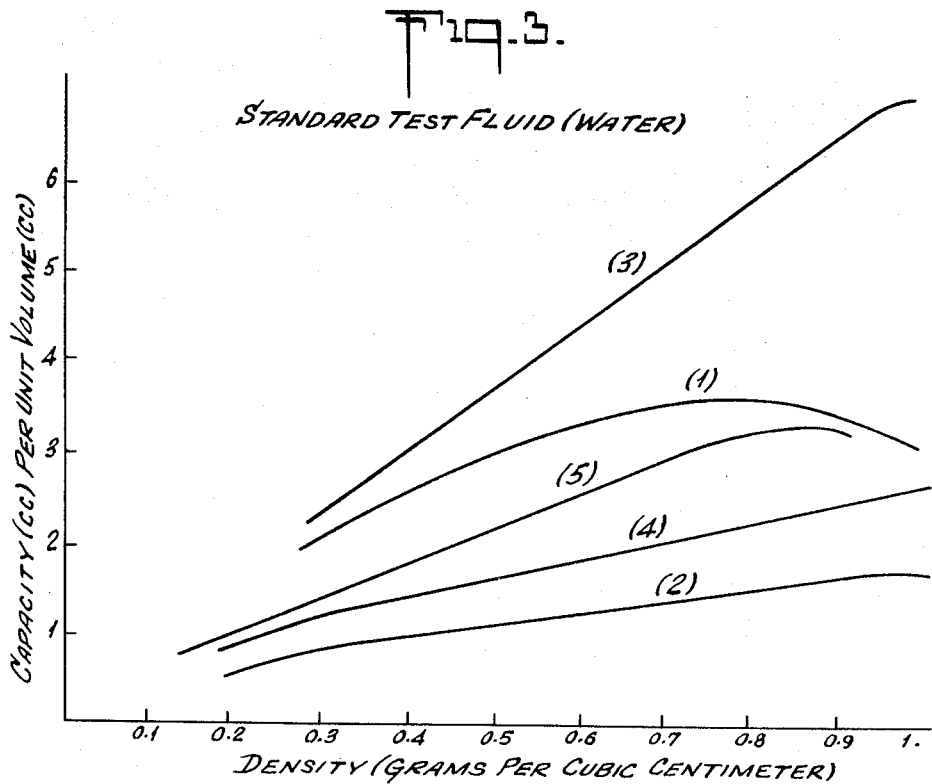
Fig. 3. STANDARD TEST FLUID (WATER)
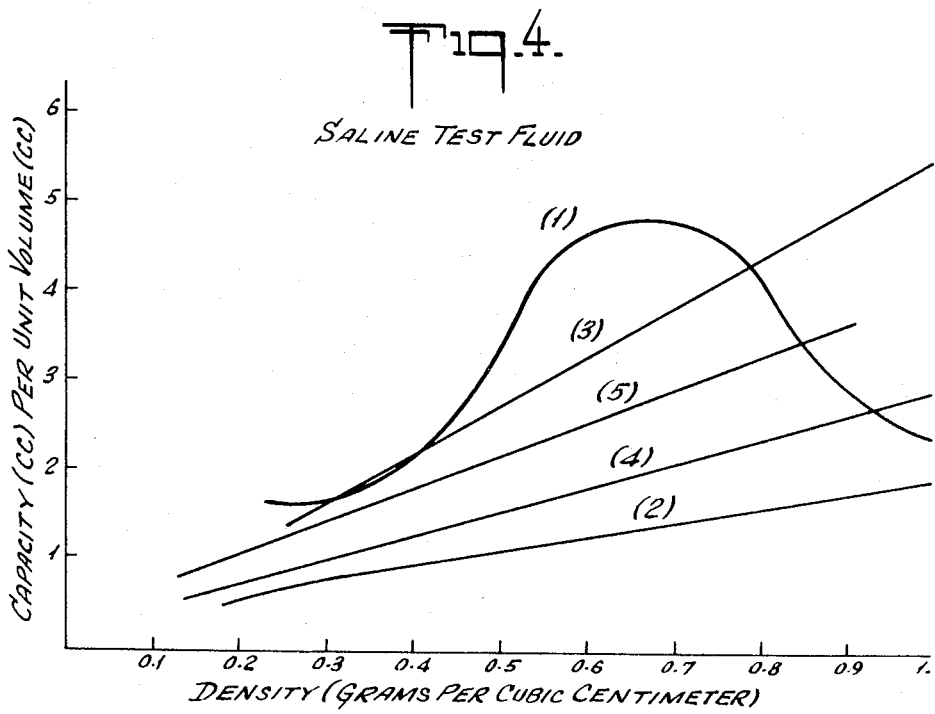
Fig. 4. SALINE TEST FLUID

SALINE FLUID ABSORPTION AND RETENTION TAMPONS AND METHODS OF MAKING THE SAME

The present invention relates to absorbent tampons having improved saline fluid absorption and retention properties, and to methods of making the same.

In the absorption of body fluids, particularly from body cavities, it is, of course, essential that the materials used to absorb the body fluids possess relatively high capacities for fluids, particularly water. Many standard tests for evaluating the relative effectiveness of such absorptive materials have been based solely or at least primarily on such fluid or water-absorptive capacities. However, body fluids are normally saline in nature and it is therefore more important that the absorptive materials have high capacities for saline solutions. Surprisingly, it has been determined that some absorptive materials which do not have superior water-absorptive materials which do not have superior water-absorptive capacities do have superior saline-absorptive capacities and hence are actually more suitable for the absorption of body fluids.

Cotton, cotton linters, rayon, wood pulp, and similar natural and synthetic cellulosic materials have long been used extensively in the preparation of absorbent tampons and similar materials for absorbing body fluids and they have been found generally satisfactory for such purposes. However, many other materials have long been studied and have been considered as possible replacements for such cellulosic materials.

Various carboxyalkyl ethers of cellulose, notably carboxymethyl cellulose, have long been considered and in some areas have been suggested for fluid absorption and retention purposes. For example, U.S. Pat No. 3,005,456, which issued Oct. 24, 1961, discloses the use of carboxyalkyl cellulose, notably carboxymethyl cellulose and carboxyethyl cellulose, particularly for catamenial tampons. However, it is to be noted that the use of such carboxyalkyl ethers of cellulose is normally limited to those having a maximum average degree of substitution (D.S.) of about 0.35 carboxyalkyl radicals per anhydroglucose unit in the cellulose. Beyond that degree of substitution, the carboxymethyl cellulose tends to become too water-soluble in its properties and the fluid absorption and retention properties fall off to an extremely low, undesirable value.

It is believed that water-soluble carboxymethyl cellulose, having an average D.S. greater than 0.35, upon being contacted by fluid, quickly becomes surface-wetted, swells rapidly, and agglomerates or cakes into a gellike mass. This gelling is at the outermost surface portions of the carboxymethyl cellulose and delays or perhaps completely blocks further access of fluid to the innermost portions of the carboxymethyl cellulose whereby very little additional fluid absorption is accomplished in a reasonable period of time.

Other efforts toward improving the fluid absorbency and retention of natural and synthetic cellulosic materials are noted in U.S. Pat. No. 3,241,553 which issued Mar. 22, 1966. This patent discloses methods including the wet cross-linking of cellulosic materials whereby their fluid absorbency and retention properties and characteristics are improved, particularly under conditions of applied pressure.

Such prior efforts have been relatively successful and improved products have been obtained. However, it is always desirable to continue improving presently known products to render them more satisfactory and therefore more acceptable to the public.

It has been discovered that improved saline fluid absorption and retention tampons may be made by forming such products from water-insoluble, wet cross-linked carboxyalkyl cellulose materials having average degrees of substitution greater than 0.35 and in the range of from about 0.4 to about 1.3, and by forming such products in such a way that their density is in the range of from about 0.4 gram per cubic centimeter to about 0.8 gram per cubic centimeter.

In the accompanying drawings and following specification, there are illustrated and described preferred designs and embodiments of articles of manufacture utilizing the present inventive concept. However, it is to be understood that the invention is not to be considered limited to the materials and the constructions disclosed, except as determined by the scope of the appended claims. With reference to the accompanying drawings:

FIG. 3 is a graph showing the relationship between the water absorbency and retention properties of various materials compared to the wet cross-linked carboxyalkyl cellulosic materials of the present invention; and FIG. 4 is a graph showing the relationship between the saline absorbency and retention properties of various materials compared to the wet cross-linked carboxyalkyl cellulosic materials of the present invention.

Figure 1:
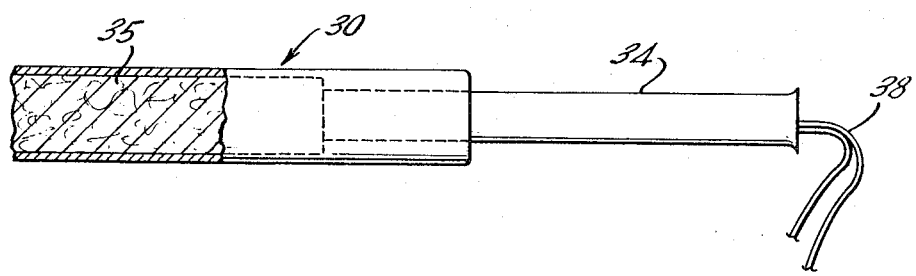
FIG. 1 is a partially cutaway view in elevation of a catamenial tampon containing the improved saline fluid absorption and retention cellulosic materials of the present invention.

In the embodiment of the invention shown in the drawings, with particular reference to FIG. 1, there is shown a catamenial tampon 30 which comprises a hollow cylindrically shaped container or applicator 32 and a smaller, cylindrically shaped, concentrically positioned plunger or ejector 34 which is slidably positioned within the applicator 32. A cylindrically shaped fluid absorption and retention mass or pad 36 is positioned with the applicator 32 and is adapted to be slidingly ejectable therefrom by movement of the plunger 34 into the applicator 32 so that the absorbent pad 36 is positioned in a body cavity to conform to the body contours of the user and to receive, absorb and retain catamenial fluids. A withdrawal cord or string 38 is secured to the base of the fluid absorption and retention mass 36 and is of sufficient length that the free end thereof extends outwardly of the body cavity for withdrawal of the tampon 36 after use. Again, such a specific form of tampon is merely illustrative of one particular use of the present invention and is not to be construed as limitative of the broader aspects thereof.

Figure 2:
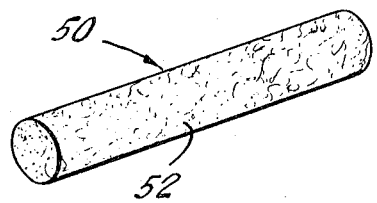
FIG. 2 is a perspective view of a dental tampon or roll containing the improved absorption and retention cellulosic materials of the present invention.

In FIG. 2, there is illustrated a dental roll or tampon 50 which comprises a cylindrically shaped roll of fluid absorbent and retention material 52 of the present invention. Such rolls normally have diameters of from about five-sixteenths inch to about one-half inch and lengths of from about 1½ inches to about 6 inches.

The absorbent material in the fluid absorption and retention bodies 36 and 52 comprises cellulosic materials which have been wet cross-linked, carboxyalkylated, and preferably carboxymethylated, and improved by the methods of the present invention. The wet cross linked carboxyalkyl cellulose is preferably in fibrous form, such as is described in U.S. Pat. No. 3,005,456, but other forms such as a powdered or granular form are acceptable, provided means are present to contain the prevent loss of such powdered or granular form prior to and during use.

The fibers which are included in the products incorporating my invention are water-insoluble, wet cross-linked carboxyalkylated cellulosic fibers and include wet cross-linked carboxyalkylated natural fibers, such as cotton, wood pulp, and cotton linters, and wet cross-linked carboxyalkylated regenerated cellulosic fibers, such as rayon. The cellulosic fibers which are starting materials of the methods of the present invention are subjected initially to a chemical treatment whereby they are chemically modified to form bonds between the hydroxyl groups in the cellulose molecules which impart to the products within which they are incorporated increased fluid-absorbing and fluid-retention characteristics.

Cross-linked cellulosic fibers may be obtained by reacting cellulosic fibers with a material one molecule of which is capable of combining with at least two hydroxyl groups in the cellulose molecule, or in adjacent cellulose molecules. The reactive groups of the cross-linking agent which combine with the hydroxyl groups may exist prior to the reaction with cellulose, as in the case of glyoxal, or they may be generated during the reaction with the cellulose, as in the case of the sodium thiosulfate derivative of divinyl sulfone. In order to cross-link cellulose, the cross-linking agent must be at least difunctional with respect to cellulose, e.g., it must react with at least two hydroxyl groups. Formaldehyde, for example, is monofunctional with regard to many substances; it is, however, difunctional with respect to cellulose. In many polyfunctional materials of the type that react with two or more hydroxyl groups, one reactive group of the polyfunctional material may react more rapidly than other groups. Consequently, within a given reaction time, not all of the reactive groups on a molecule of the polyfunctional material may react with the hydroxyl groups in the cellulose molecule to form cross-links; only one of the reactive groups may so react. Cross-linking occurs when at least two of the reactive groups in a molecule of the polyfunctional material react.

Cellulose can be cross-linked in a number of ways and, in accordance with current concepts, may be dry cross-linked or wet cross-linked. The two types of cross-linking refer to the manner in which the cross-linking is done.

Dry cross-linked cellulose is obtained when the cellulose is dry and in a collapsed state at the time of cross-linking. A collapsed state is obtained by removing most or all of the water which causes the fiber to swell. In one known procedure, the cellulose is passed through a boric acid solution, dried, and then heated in a sealed tube in the presence of paraformaldehyde. The fibers are then washed free of unreacted material. A more common technique is to apply the cross-linking agent and a catalyst to the cellulose in an aqueous bath, drive off the water in a drying step, and react the cross-linking agent with the cellulose in a subsequent curing step.

Wet cross-linked cellulose is obtained when the cross-linking agent is reacted with the cellulose while the cellulose is wet and in a swollen state. Ordinarily the cellulose is maintained in a swollen state by water which is present during the reaction. However, techniques have been developed whereby the cellulose can be maintained in a swollen state in the absence of water by using in lieu thereof an inert, nonvolatile substance. Cellulose fibers so treated have the properties of wet cross-linked cellulose even through the reaction takes place in the absence of significant amounts of water.

Wet cross-linked and dry cross-linked cellulosic fibers can be distinguished. The strain recovery of a dry cross-linked cellulose fiber, the crease recovery of a fabric of such fibers, and the compressional recovery of a bat of such fibers is significantly greater than that of untreated cellulose, each being compared respectively in a conditioned dry state and in a wet state. In the conditioned dry state, these characteristics of wet cross-linked cellulose are essentially the same as those of untreated cellulose. When in the wet state, however, wet cross-linked cellulose is much more resilient than untreated cellulose in the wet state.

A dyeing test may also be used to distinguish wet cross-linked from dry cross-linked cellulosic fibers. In this test, samples of wet cross-linked cellulose, dry cross-linked cellulose and untreated cellulose, all in the same moisture state, either conditioned dry or dripping wet, are immersed into a boiling solution containing 1 percent of Calcomine Sky Blue FF Ex. Conc., a dye supplied by American Cyanamid Company. After 1 minute of thorough agitation, the samples are removed and rinsed in cold water until the rinse water is free from traces of the dye. Wet cross-linked cellulosic fibers dye darker than untreated cellulosic fibers while dry cross-linked fibers dye lighter.

The present invention will be described in greater particularity combination with the wet cross-linking reaction wherein the fibers are wet, swollen and not collapsed. The invention will be disclosed specifically with reference to the use of formaldehyde as the cross-linking agent. This, however, is for purposes of illustration and it is to be appreciated that other cross-linking agents can be used. Additional cross-linking agents, for example, include: condensation products of formaldehyde with organic compounds such as urea, thiourea, gaunidine, or melamine, which contain at least two active hydrogen groups, particularly dimethylolurea and dimethylol ethyleneurea; dicarboxylic acids; dialdehydes such as glyoxal; diepoxides such as diglycidyl ether; diisocyanates; divinyl compounds; polyhalogenides such as 1,3-dichloroacetone; halohydrins such as epichlorohydrin and glycerol-1,3-dichlorohydrin; N-methylol compounds; etc.

Subsequent to the wet cross-linking, the cellulosic materials are then carboxyalkylated by well-known methods in the arts to a degree of substitution greater than 0.35 and in the range of from about 0.4 to about 1.3. Reference is made to Carbohydrate Chemistry, Vol. III, (Cellulose) (1963), pages 322–327 for a disclosure of some of the details of such carboxyalkylating methods. Such publication discloses that carboxymethylation to degrees of substitution ranging from 0.3 to 1.3 or higher conventionally takes place by initially treating the cellulosic materials with aqueous sodium hydroxide whereby alkali cellulose if formed which is subsequently treated with chloracetic acid. Normally, an excess of sodium hydroxide is used whereby the sodium salt of carboxyalkyl cellulose is obtained. This reaction is well known and needs no further description.

Although the invention will be described with special emphasis of wet cross-linked carboxymethyl cellulose as the saline fluid absorption and retention material in a specific product, namely, a catamenial tampon, such is done for illustrative purposes and the broader aspects of the invention are not to be construed as limited thereto. Also the broader aspects of the present invention are to be considered equally applicable to other articles of manufacture mentioned herein as well as to other ethers of cellulose such as carboxyethyl cellulose, carboxymethyl hydroxyethyl, or other cellulose ethers containing the carboxyalkyl radical or, more precisely, as will be pointed out hereinafter, the sodium salts thereof.

The idealized structural formula for carboxymethyl cellulose is as follows, showing a degree of substitution of 1.0:

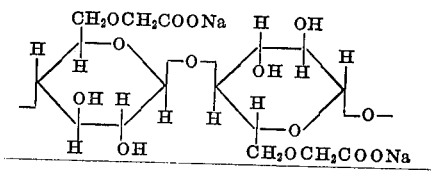

The idealized structural formula for carboxyethyl cellulose is as follows, showing a degree of substitution of 1.0:

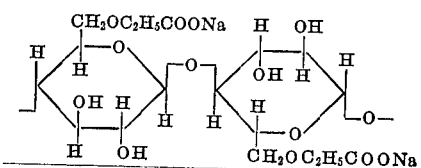

Carboxyethyl cellulose is obtained by basically the same mechanism as is used for carboxymethyl cellulose except that monochlorpropionic acid and sodium hydroxide is used rather than monochloracetic acid and sodium hydroxide.

The structural formula for carboxymethyl hydroxyethyl cellulose is as follows, showing a degree of substitution of 0.5 for carboxymethyl and 0.5 for hydroxyethyl:

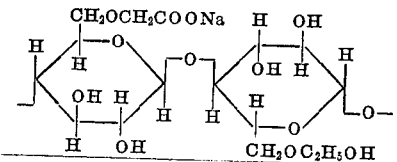

Carboxymethyl hydroxyethyl cellulose is prepared by carrying out the hydroxyethylation reaction first, and then following with the carboxymethylation reaction second.

Consideration of the above structural formulas will indicate that, although the terms "carboxymethyl cellulose," "carboxyethyl cellulose" and "carboxymethyl hydroxyethyl cellulose" are used herein, a more precise but lengthier term should include a reference to the fact that they are commercially available and are normally used as the sodium salt of such chemical compounds. Other alkali metal salts which are not as commercially available but which are equally applicable are the potassium, lithium, rubidium, and cesium salts.

It is not essential that the absorbent bodies contain only wet cross-linked carboxyalkyl cellulosic materials. In fact, in many cases, it is preferred that selected blends of the wet cross-linked carboxyalkyl cellulose and other absorbent fibers of materials be used. Such other absorbent fibers or materials must, however, be in relatively low proportions and may be included in percentages as low as about 1 percent by weight or as high as about 10 percent by weight. Other fibers and other materials which can be included are cotton, rayon, wood pulp, comminuted tissue or other paper products, etc.

If desired, other materials and other fibers, not necessarily fluid absorbent, may be added in similar percentages by weight (as noted in the preceding paragraph) to obtain special characteristics and properties. Such other materials and other fibers include, for example, untreated carboxymethyl cellulose; cellulose esters such as cellulose acetate; polyamide fibers such as nylon 6, nylon 610, nylon 66, nylon 12, etc.; polyester fibers such as "Dacron," "Kodel," etc.; acrylic fibers such as "Dynel," "Orlon"; polyolefinic fibers such as polypropylene and polyethylene; etc. It is also contemplated that the wet, cross-linked carboxyalkyl cellulose may form a portion of a more complex absorbent structure. For example, it may be used as a concentrically, centrally located core member of a catamenial tampon and be surrounded by a cylindrical sheath of other absorbent fibers or materials. Or it may be used in a multilayered, laminated structure with other materials or fibers. When used with a cover material, such cover material may be a woven fabric such as gauze, or a scrim, or may be a nonwoven or even a knitted fabric. Such cover material may comprise wet, cross-linked carboxyalkylated cellulosic or other fibrous materials.

The invention will be described in greater detail by reference to the following examples and the accompanying drawings wherein specific embodiments of the inventive concept are set forth for illustrative but not for limitative purposes.

In these Examples, wet cross-linking takes place in an aqueous solution containing, by volume, 20 percent Formalin, 50 percent concentrated hydrochloric acid, and 30 percent water at room temperature for a period of 20 minutes. The cellulosic materials are then removed from the treating solution and thoroughly rinsed, first with hot water and then with cold water. The treated cellulosic materials are then air-dried. The Formalin referred to contains 37 percent formaldehyde and 63 percent water.

EXAMPLE I

The following cellulosic materials are used:
1. wet formaldehyde cross-linked carboxymethyl cellulose having a D.S. of about 0.7;
2. comminuted wood pulp fibers;
3. a 50–50 percent blend (by weight) of (a) wet formaldehyde cross-linked carboxymethyl cellulose having a D.S. of about 0.7 and (b) comminuted wood pulp fibers;
4. wet cross-linked wood pulp fibers; and
5. wet cross-linked rayon.

The five samples are individually comminuted in a grinding mill and then laid in the form of individual pads on precut lengths of conventional nonwoven fabric tampon cover 6 inches long and 4 inches wide. All samples weigh approximately 40 grains. The tampon covers are then folded around the individual pads and are tied by a withdrawal cord at the center in the conventional manner.

Several samples of each type are prepared and are compressed in a die having a diameter of 0.485 inch for a period of 15 seconds with varying stroke lengths to produce a series of samples having a range of densities from 0.1 to 1.0 grams per cubic centimeter. All samples are then tested for fluid holding capacity at 24 inches of water pressure for 20 minutes. The standard test fluid comprises 0.1 percent nonionic surfactant, 0.1 percent dye, and 99.8 percent water. The results are shown in FIG. 3.

In FIG. 3, as in FIG. 4 to be described hereinafter. The horizontal abscissae are densities, as measured in grams per cubic centimeter, and the vertical ordinates are absorbent capacities, as measured in units of capacity (cc.) per unit of the original tampon volume (cc.).

It is to be observed in FIG. 3 that the invention wet cross-linked carboxymethyl cellulose (1) is inferior in water absorption to the 50–50 percent blend (3) of wet cross-linked carboxymethyl cellulose and wood pulp for all density ranges. This basically follows the teachings of the prior art to the effect that blends of carboxymethyl cellulose are generally preferred to products containing 100 percent carboxymethyl cellulose when absorbency properties are involved. Note U.S. Pat. No. 3,371,666 and British Pat. No. 1,096,836. It is also to be emphasized that the standard test fluid used in this example is nonsaline water.

The test samples for (2) comminuted wood pulp fibers, (4) wet cross-linked wood pulp fibers, and (5) wet cross-linked rayon are all inferior to the samples containing the wet cross-linked carboxyalkyl cellulosic materials.

EXAMPLE II

The procedures of example I are followed substantially as set forth therein except that the standard test (nonsaline) solution is replaced by a saline solution containing 1 percent by weight of sodium chloride which is closer to the constitution of body fluids, at least insofar as salt content is concerned.

The results are shown in FIG. 4. It is to be observed that the invention product sample containing 100 percent wet cross-linked carboxymethyl cellulose (1) has surprisingly surpassed the absorbency of the 50–50 percent blend (3) in the saline test in the area having densities of from about 0.4 gram per cubic centimeter to about 0.8 gram per cubic centimeter.

Such results ate all the more gratifying when it is realized that tampons are customarily used in vivo under saline conditions rather than nonsaline conditions.

It is also to be observed that, outside of the density range of from about 0.4 grams per cubic centimeter to about 0.8 grams per cubic centimeter, the 100 percent carboxymethyl cellulose sample does not surpass the 50–50 percent blend sample.

The test samples for (2) comminuted wood pulp fibers, (4) wet cross-linked wood pulp fibers, and (5) wet cross-linked rayon are all inferior to the samples containing the wet cross-linked carboxyalkyl cellulosic materials. It is to be noted with interest that the effectiveness of these three latter samples is not materially changed in the saline solution, as compared to their effectiveness in water.

EXAMPLES III, IV & V

The procedures of example II are followed substantially as set forth therein with the exception that the wet cross-linked carboxymethyl cellulose has a degree of substitution of (III) 0.5; (IV) 0.9; and (V) 1.2. The results are generally comparable to the results obtained in example II.

EXAMPLE VI

The procedures of example II are followed substantially as set forth therein with the exception that the wet, cross-linked carboxymethyl cellulose is replaced by wet, cross-linked carboxyethyl cellulose having a degree of substitution of 0.5. The results are generally comparable to the results obtained in example II.

EXAMPLE VII

The procedures of example II are followed substantially as set forth therein with the exception that 5 percent by weight of wood pulp fibers is included with the wet, cross-linked carboxymethyl cellulose. The results are generally comparable to the results obtained in example II.

As used herein, the term "saline" or "saline fluid" is intended to include normal saline which is a 0.9 percent aqueous solution of common salt, or commercial saline solution which is a 0.6 percent aqueous solution of sodium chloride, or similar aqueous salt solutions having concentrations of salt of from about 0.6 percent to about 1.2 percent by weight, and preferably from about 0.8 percent to about 0.9 percent.

The testing of the various samples for fluid holding capacity generally follows the procedures set forth in U.S. Pat. No. 3,241,553 wherein the tampon to be tested is placed into a porous plate Buchner funnel. A resilient rubber surface which snugly fits within the funnel is lowered to contact the tampon and pressure equal to about 24 inches of water is applied to the tampon through the resilient rubber surface. The test fluid is introduced upwardly through the stem of the funnel and just covers the test tampon. Absorption is permitted to take place for 20 minutes. The test fluid is then removed and the test tampon is permitted to drain under the applied 24-inch water pressure. The pressure is then removed and the wet tampon is quickly weighed. Calculations then follow to yield the indicated results.

Although the present invention has been described with reference to several examples and embodiments showing specific materials and specific products in specific arrangements and conformations, such is not to be considered limitative of the invention but merely illustrative thereof.

What is claimed:

1. An improved saline fluid absorption and retention tampon having a density of from about 0.4 gram per cubic centimeter to about 0.8 gram per cubic centimeter and comprising water-insoluble, wet cross-linked carboxyalkyl cellulosic materials having average degrees of substitution of from about 0.4 to about 1.3.

2. An improved saline fluid absorption and retention tampon as defined in claim 1, wherein the water-insoluble, wet cross-linked carboxyalkyl cellulosic material is carboxymethyl cellulose.

3. An improved saline fluid absorption and retention tampon as defined in claim 1, wherein the water-insoluble, wet cross-linked carboxyalkyl cellulosic material is carboxyethyl cellulose.

4. A method of making an improved saline fluid absorption and retention tampon which comprises: wet cross-linking cellulosic materials to increase the compressing properties thereof; carboxyalkylating the wet cross-linked cellulosic materials to increase the saline fluid absorption and retention properties thereof; incorporating the wet cross-linked, carboxyalkylated cellulosic materials in a tampon; and compressing said wet cross-linked carboxyalkylated cellulosic materials to a density range of from about 0.4 gram per cubic centimeter to about 0.8 gram per cubic centimeter to provide improved saline fluid absorption and retention properties therein.

5. A method of making an improved saline fluid absorption and retention tampon as defined in claim 4, wherein the carboxyalkylating step is a carboxymethylation.

6. A method of making an improved saline fluid absorptive and retention tampon as defined in claim 5, wherein the carboxymethylation is carried out to a degree of substitution of from about 0.4 to about 1.3 carboxymethyl radicals per anhydroglucose unit in the cellulosic materials.

7. A method of making an improved saline fluid absorption and retention tampon as defined in claim 4, wherein the carboxyalkylating step is a carboxyethylation.

* * * * *